United States Patent
Zhang et al.

(10) Patent No.: US 11,043,710 B2
(45) Date of Patent: Jun. 22, 2021

(54) METAL AIR FUEL CELL AND ITS SYSTEM

(71) Applicant: BEIJING YIYUAN NEW ENERGY TECHNOLOGY CO.,LTD, Beijing (CN)

(72) Inventors: Shuxiong Zhang, Beijing (CN); Lei Hong, Beijing (CN); Yunfan Zhang, Beijing (CN)

(73) Assignee: BEIJING YIYUAN NEW ENERGY TECHNOLOGY CO., LTD, Beijing (CN)

( * ) Notice: Subject to any disclaimer, the term of this patent is extended or adjusted under 35 U.S.C. 154(b) by 70 days.

(21) Appl. No.: 15/935,020

(22) Filed: Mar. 25, 2018

(65) Prior Publication Data

US 2019/0207282 A1     Jul. 4, 2019

(30) Foreign Application Priority Data

Dec. 28, 2017   (CN) .......................... 201711453908.8
Dec. 28, 2017   (CN) .......................... 201711453922.8

(51) Int. Cl.
*H01M 12/06*     (2006.01)
*H01M 12/08*     (2006.01)
*H01M 50/30*     (2021.01)
*H01M 4/36*     (2006.01)
*H01M 50/148*     (2021.01)

(52) U.S. Cl.
CPC ............. *H01M 12/06* (2013.01); *H01M 4/36* (2013.01); *H01M 12/08* (2013.01); *H01M 50/1537* (2021.01); *H01M 50/30* (2021.01)

(58) Field of Classification Search
CPC .... H01M 12/06; H01M 12/08; H01M 2/0452; H01M 2/12; H01M 4/36
See application file for complete search history.

(56) References Cited

FOREIGN PATENT DOCUMENTS

CN     104577262 A   *   4/2015
CN     105280989 A   *   1/2016

* cited by examiner

*Primary Examiner* — Carlos Barcena
(74) *Attorney, Agent, or Firm* — Houtteman Law LLC

(57) ABSTRACT

A metal air fuel cell is provided. The metal air fuel cell includes a plurality of unit bodies arranged in parallel in a battery housing. Each of the plurality of unit bodies includes a housing, a front cover, an alloy plate, a sealing ring, a battery cover, an upper copper electrode, an air electrode, and a back cover. The upper copper electrode, the battery cover and the alloy plate are connected by bolts to form a metal fuel monomer.

6 Claims, 4 Drawing Sheets

METAL AIR FUEL CELL AND ITS SYSTEM

FIELD OF THE INVENTION

The present invention relates to the technical field of new energy battery, and particularly relates to a metal air fuel cell, and a system having this metal air fuel cell.

BACKGROUND OF THE INVENTION

The metal air fuel cell (ie, the metal air battery) is a chemical power that produces electrical power by chemical reaction under the catalysis of catalyst, taking the oxygen in the air as a positive active substance, taking the metal as a negative active substance, and using the conductive solution as electrolyte.

Metal air fuel cell has many unique advantages. Its fuel is metal material, such as aluminum, magnesium, zinc, lithium and sodium. Because of the abundant reserves of fuel such as aluminum, magnesium and zinc, the metal air fuel cell resources can be fully supplied. The positive active substance is oxygen in the air, and the cell itself does not need to carry. The size of energy carried by the cell is determined by the amount of metal as negative pole, which makes the actual rate energy of this cell can reach more than 350 Wh/kg (the current lithium ion battery for 100 Wh/kg), with great performance advantages. The products after reaction can be reelectrolyzed aluminum oxide (or magnesium hydroxide) into metal by using wind energy, solar energy, water energy and other clean energy or electric energy in the rich area, then reinstalled into a metal air fuel cell to discharge, driving the electric vehicle. This can be achieved on the large scale production, can reduce pollution, reduce emissions, and can realize the centralized power supply, decentralized, low cost power will be transferred to the place in the high cost of local power, and power will be transferred from easy access to difficult to obtain. A new car life of zero pollution and zero emissions can be truly achieved. In the process, the free pollution is achieved, and green energy of zero emission is recycled. Metal air batteries are becoming more and more important in the world.

Based on the above advantages of a metal air fuel cell, many countries and individuals are studying to produce more practical products of the same kind. The main drawback of the present product is that the replacement and addition of metal fuel is inconvenient. A metal air fuel cell is a one-way metal fuel reaction that produces a current, and if need to be used continuously, the battery system must be able to easily update the fuel.

SUMMARY OF THE INVENTION

For the above technical problem, the present invention provides a metal air fuel cell, which can replace a single metal fuel conveniently, making the whole product more convenient and more conducive to maintenance in the process of use, so as to increase the service life of a product and enhance the user experience of a product.

The technical solution of the present invention is, a metal air fuel cell includes several cell bodies. Each unit body comprises a housing, a front cover, an alloy plate, a sealing ring, a battery cover, an upper copper electrode, an air electrode, a back cover.

The front part of a housing is sealed by the bonding of a front cover and an air electrode to form a cavity between a housing and the bonded front cover and an air electrode. The rear part of a housing is sealed by the bonding of a back cover and an air electrode to form a cavity between a housing and the bonded back cover and an air electrode. A sealing ring is placed in a groove of a battery cover. An upper copper electrode is placed in a groove of a battery cover through a side gap of a battery cover, and an upper copper electrode, a battery cover and an alloy plate are connected by bolts to form a metal fuel monomer.

A metal fuel monomer is put into a housing, and is matched with a groove of a battery cover and a boss on a mouth part of a housing, and then the sealing of a mouth part of a housing is realized by compressing a sealing ring.

There is a circular through hole in a lower part of a housing, and three locating holes are evenly distributed around a through hole. A groove and a convex are respectively arranged on both sides of a through hole. A sealing ring is arranged inside a groove, and a sealing ring is compressed by bolts through a locating hole after installing all battery monomers, in order to achieve the seal between monomers.

When some metal fuel needs to be replaced, if we remove a battery cover and remove bolts, we can take out a metal fuel monomer of the metal fuel, then remove an alloy plate and replace a new alloy plate. Therefore, it can replace a single metal fuel conveniently, making the whole product more convenient and more conducive to maintenance in the process of use, so as to increase the service life of a product and enhance the user experience of a product.

A system of the metal air fuel cell is also provided, which includes a box A1, several batteries, a storage tank A2, a ventilation pipe A5, a water pipe A6, and a drawing water plug A7. Each cell monomer is fixed in the box. A storage tank is located on the upper part of a box, and a storage tank cover A3 is provided on a storage tank. A drawing water plug is fixed on a through hole, and an interface drawn from a drawing water plug is connected with one end of a water pipe. The other end of a water pipe is connected with a water outlet interface at the bottom of a storage tank, so that a storage tank, a box and each battery monomer form a passage. A vent is in the upper side of a box, which is connected with one end of a ventilation pipe, and the other end of a ventilation pipe is connected to the upper part of a storage tank cover.

In the present invention, a storage tank is located on the upper part of a box, and a storage tank cover is provided on a storage tank. A through hole is placed in the bottom of each battery monomer, and a drawing water plug is fixed on a through hole, and an interface drawn from a drawing water plug is connected with one end of a water pipe. The other end of a water pipe is connected with a water outlet interface at the bottom of a storage tank, so that a storage tank, a box and each battery monomer form a passage. In the process of electrolyte injection, electrolyte is continuously filled into the inner space of a box, so that gas is compressed and extruded through an air exhaust port of the upper part of a box. Gas enters into a storage tank through the guidance of a ventilating pipe. Therefore, the system of the metal air fuel cell can add electrolyte into a cell monomer continuously in use, and in each battery monomer, the use of the battery is not affected by the lack of electrolyte with the reaction. When adding electrolyte, without separate addition of each monomer, only one addition during the initial stage of liquid addition is needed, which is convenient and effective.

DETAILED DESCRIPTION OF THE PREFERRED EMBODIMENTS

Figure 1:
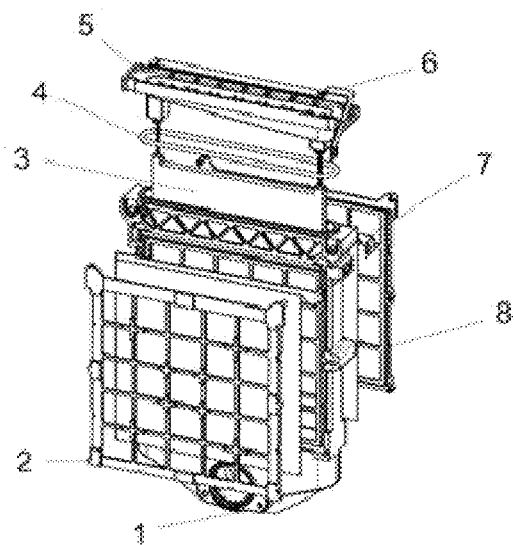
FIG. 1 is a schematic view of the whole structure of a metal air fuel cell according to the present invention.

As shown as FIG. 1-4, this metal air fuel cell includes several cell bodies. Each unit body comprises a housing 1, a front cover 2, an alloy plate 3, a sealing ring 4, a battery cover 5, an upper copper electrode 6, an air electrode 7, a back cover 8.

The front part of a housing is sealed by the bonding of a front cover and an air electrode to form a cavity between a housing and the bonded front cover and air electrode. The rear part of a housing is sealed by the bonding of a back cover and an air electrode to form a cavity between a housing and the bonded back cover and air electrode. A sealing ring is placed in a groove i of a battery cover. An upper copper electrode is placed in a groove of a battery cover through a side gap of a battery cover, and an upper copper electrode, a battery cover and an alloy plate are connected by bolts to form a metal fuel monomer.

A metal fuel monomer is put into a housing, and is matched with a groove of a battery cover and a boss on a mouth of a housing, and then the sealing of a mouth part of a housing is realized by compressing a sealing ring.

There is a circular through hole in a lower part of a housing, and three locating holes a are evenly distributed around a through hole. A groove and a convex are respectively arranged on both sides of a through hole. A sealing ring is arranged inside a groove, and a sealing ring is compressed by the bolts through a locating hole after installing all battery monomers, in order to achieve the seal between monomers.

When some metal fuel needs to be replaced, if we remove a battery cover and remove bolts, we can take out a metal fuel monomer of the metal fuel, then remove an alloy plate and replace a new alloy plate. Therefore, it can replace a single metal fuel conveniently, making the whole product more convenient and more conducive to maintenance in the process of use, so as to increase the service life of a product and enhance the user experience of a product.

Figure 2:
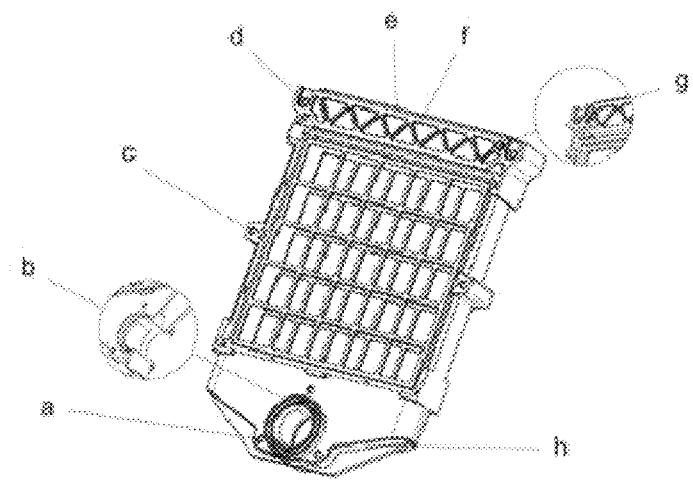
FIG. 2 is a schematic view of a housing of a metal air fuel cell according to the present invention.

Preferably, as shown as FIG. 2, bolt holes C are provided on both sides of the said housing, so that a metal fuel monomer is fastened and positioned after grouping.

Preferably, as shown as FIG. 2, the said three locating holes are respectively an upper locating hole above a through hole, a left locating hole on the left of a through hole, and a right locating hole on the right of a through hole. An upper locating hole is provided with a support b in a housing, and both sides of a housing are supported by a support b, and a locating hole passes through from the interior of a support. In this way, a housing can not be deformed during the pretightening process of bolts, in order that a sealing ring in a lower through hole is fully compressed to achieve the seal. At the same time, a locating hole passes through from the interior of a support, so that it will not leak after the assembly is formed.

Preferably, as shown as FIG. 2, The reinforcing rib f is set on both sides of a mouth part of a housing 1. In the case of reducing the overall weight, the bending strength can be improved, a battery cover 5 can not appear large deformation in the process of compressing and pretightening a slipknot bolt, and the sealing effect can be ensured.

Preferably, as shown as FIG. 2, a slope h is provided in the bottom of a housing 1, whose inclination is between 2 and 60 degrees. A slope can make the residue of the reactant in a cell exhaust more smoothly.

Preferably, as shown as FIG. 2, the upper part of a housing 1 is provided with a groove d, and a locating hole is in a groove d. After metal fuel monomers are grouped, slipknot bolts are put into a groove d, and positioned by bolts passing through locating holes. By the pretightening of slipknot bolts and a pressing plate in the upper part, a battery cover is fixed on a housing, to achieve the seal of the upper part of a cell. The upper part of a housing 1 is provided with an annular convex e, to achieve the seal by a sealing ring between it and a battery cover. There is a through hole g beside a groove d, and a through hole g passes through an inner cavity of a housing. There are grooves and convexs at both sides of a housing, in which seal rings are placed. Housings after grouping are achieved to seal between metal fuel monomers by bolts passing through locating holes in a groove d.

Figure 3:
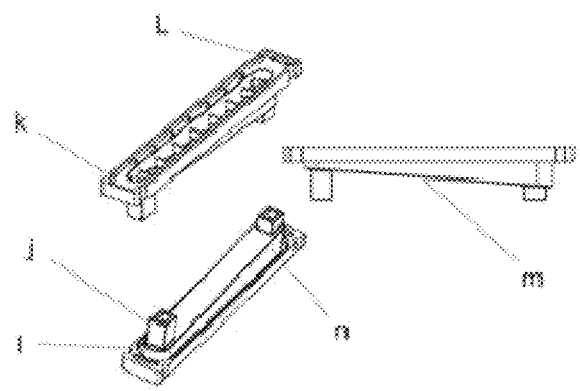
FIG. 3 is a schematic view of a battery cover of a metal air fuel cell according to the present invention.
Figure 4:
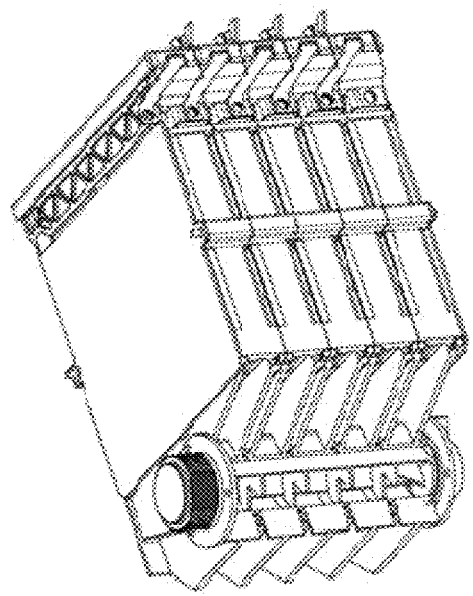
FIG. 4 is a stereogram of a metal fuel monomer of a metal air fuel cell according to the present invention, which is set up.

Preferably, as shown as FIG. 3, a battery cover is extended to form a column support j for fixing an alloy plate. The top of a support j is provided with a groove, in which a seal ring is placed. The sides of both ends of a battery cover are provided with grooves k, and slipknot bolts pass through grooves k, and slipknot bolts are fixed not to fall, which is convenient for installation. One end of a battery cover has a long strip through hole L, and an upper copper electrode passes smoothly through a long strip through hole L. The bottom of a battery cover is provided with an inclined plane m. The height of one end of an inclined plane is above a through hole g on a housing, and the other end inclines downward, whose inclination angle is between 1 and 45 degrees, so as to ensure that gas in a cell can also be discharged smoothly in the case of a cell group being tilted. A convex n on a battery cover is matched with a mouth part of a housing to provide effective support in the case of a cell group being vibrating.

Figure 5:
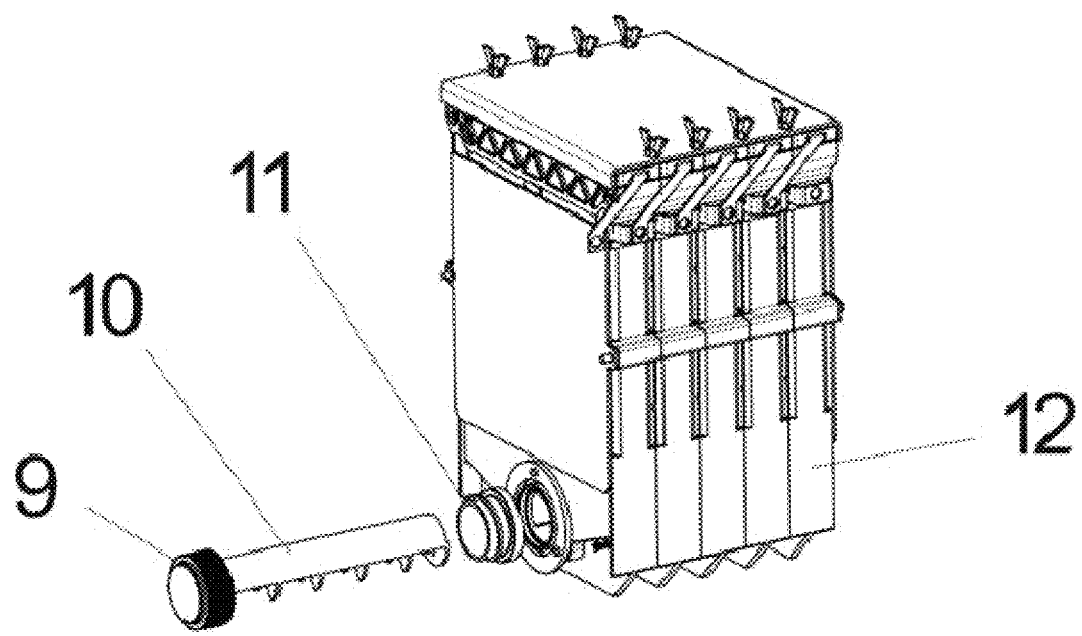
FIG. 5 is a schematic view of a plug, a slagging rod, a thread joint of a metal air fuel cell according to the present invention.
Figure 6:
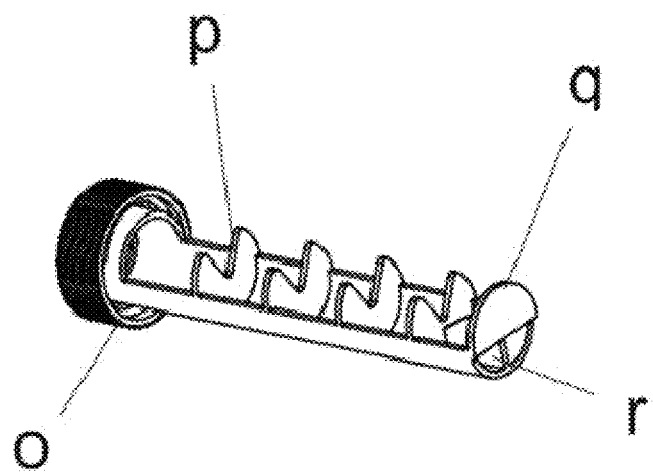
FIG. 6 is a schematic view of a slagging rod of a metal air fuel cell according to the present invention.

Preferably, as shown as FIGS. 5 and 6, the metal air fuel cell also includes a plug 9, a slagging rod 10, and a threaded joint 11.

A slagging rod is fixed inside a plug. The inside of a plug is provided with an internal thread to be connected to a threaded joint. An 0 type gasket with the sealing purpose of a plug and a threaded joint is placed inside a plug. A threaded joint is fixed on a battery housing 12 by bonding.

Preferably, as shown as FIGS. 5 and 6, grids p are evenly spaced on a slagging rod. The spacing of each grid is equal to the distance between metal fuel monomers. Each grid is arranged in the closed area between cavities of metal fuel monomers, and a gap or through hole is set on each grid.

Preferably, as shown as FIG. 6, At the top of a slagging rod, there is a block q, and the bottom of a block has a through hole r, which makes each cavity semi-closed.

When liquid is injected from the exterior of a housing 12, it comes into the inner of the chamber of a battery by a through hole r. Because there is a gap or a through hole between grids p in a slagging rod, so that the chamber of a battery is in the communication state, the operation of injecting water in each monomer can not be affected. While it is able to connect a monomer battery, it can also reduce the connection area between monomer electrodes, thus reducing the problem of short circuit loss inside a battery.

When a battery works at low load and in short time, a plug 9 can be unscrewed, and taken out together with a slagging rod 10. At this time, the viscosity of the reactant in a battery housing is low, and it can be poured out directly from a threaded joint.

When the viscosity of the reactant inside a battery is high, a plug 9 can be unscrewed and removed. More thick liquid is poured out, then a plug 9 is inserted again, and the opening position of a slagging rod 10 corresponds to the open position of the inner cavity of a battery housing 12 by rotating the position of a plug 9. After a period of time, a plug 9 is taken out. At this time, the reactant is attached to the clearance of a slagging rod 10 and is removed together. After taking out, the reactant on a slagging rod 10 is cleaned. This operation is repeated.

After several times of cleaning, when the reactant adsorbed and scraped by a slagging rod 10 becomes less, by injecting water inside a box to dilute the reactant to achieve the purpose of complete cleaning.

Based on the above advantages of metal air fuel cell, many countries and individuals are studying to produce more practical products of the same kind. At present, the main defect of products is: a metal air fuel cell will consume a large amount of electrolyte (e.g., water) in use, and a system of a metal air fuel cell is generally a good package. Once electrolyte of a system of a metal air fuel cell consumes too much, it has to be abandoned, or be opened to add electrolyte into the interior of a battery. If it is abandoned directly, it will cause a lot of waste, and it also affects the efficiency and convenience of a product. If it is opened to add electrolyte into the interior of a battery, it will greatly affect the user's experience.

Figure 7:
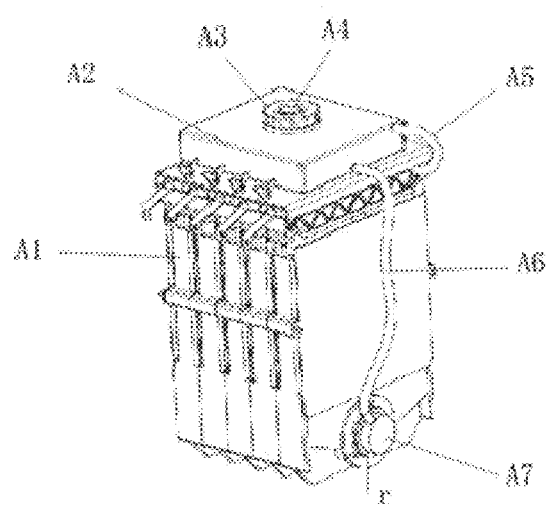
FIG. 7 is a schematic view of the whole structure of a system of a metal air fuel cell according to the present invention.

As shown as FIG. 7, a system of the metal air fuel cell is also provided, which includes a box A1, several batteries (ie, the above-mentioned metal air fuel cell), a storage tank A2, a ventilation pipe A5, a water pipe A6, and a drawing water plug A7. Each battery monomer is fixed in the box. A storage tank is located on the upper part of a box, and a storage tank cover A3 is provided on a storage tank. A drawing water plug is fixed on a through hole, and an interface drawn from a drawing water plug is connected with one end of a water pipe. The other end of a water pipe is connected with a water outlet interface at the bottom of a storage tank, so that a storage tank, a box and each battery monomer form a passage. A vent is in the upper side of a box, which is connected with one end of a ventilation pipe, and the other end of a ventilation pipe is connected to the upper part of a storage tank cover.

In the present invention, a storage tank is located on the upper part of a box, and a storage tank cover is provided on a storage tank. A through hole is placed in the bottom of each battery monomer, and a drawing water plug is fixed on a through hole, and an interface drawn from a drawing water plug is connected with one end of a water pipe. The other end of a water pipe is connected with a water outlet interface at the bottom of a storage tank, so that a storage tank, a box and each battery monomer form a passage. In the process of electrolyte injection, electrolyte is continuously filled into the inner space of a box, so that gas is compressed and extruded through an air exhaust port of the upper part of a box. Gas enters into a storage tank through the guidance of a ventilating pipe. Therefore, the system of the metal air fuel cell can add electrolyte into a cell monomer continuously in use, and in each battery monomer, the use of the battery is not affected by the lack of electrolytes with the reaction. When adding electrolyte, without separate addition of each monomer, only one addition during the initial stage of liquid addition is needed, which is convenient and effective.

In use, water can be added into a box by opening a storage tank cover, and liquid and liquid level in a box can be observed at the same time.

Preferably, the said through hole is round, and its cross-section area is equal to the cross-section area of a drawing water plug. This can make electrolyte flow more smoothly.

Preferably, a waterproof and breathable valve A4 is installed on a storage tank cover, and a waterproof and ventilating valve and a storage tank cover constitute a unit that can be assembled and disassembled at the same time. After gas enters the interior of a storage tank, gas inside a storage tank is further compressed. After achieving the designed pressure of a waterproof and breathable valve, gas is discharged through a waterproof and breathable valve. This can greatly reduce the pressure inside a storage tank, prevent the accumulation of hydrogen in a storage tank and avoid liquid flowing out. Or, a waterproof breathable valve can also be installed at the top of a storage tank, which can also be achieved the purpose.

The above stated is only preferable embodiments of the present invention, and it should be noted that the above preferable embodiments do not limit the present invention. The claimed scope of the present invention should be based on that defined by the claims. For a skilled person in this technical field, without departing from spirit and scope of the present invention, any improvement and amendment can be made, and these improvement and amendment should belong to the claimed scope of the present invention.

The invention claimed is:

1. A metal air fuel cell, comprising: a plurality of unit bodies arranged in parallel in a battery housing (12), each of the plurality of unit bodies comprising a housing (1), a front cover (2), an alloy plate (3), a sealing ring (4), a battery cover (5), an upper copper electrode (6), an air electrode (7), a back cover (8);

wherein a front part of the housing (1) is sealed by the bonding of the front cover (2) and the air electrode (7) to form a cavity between the housing and the front cover (2) and the air electrode (7), a rear part of the housing (1) is sealed by the bonding of the back cover (8) and the air electrode (7) to form a cavity between the housing (1) and the back cover (8) and the air electrode (7), the sealing ring (4) is placed in an annular groove (i) formed on a bottom side of the battery cover (5), the upper copper electrode (6) is placed in a groove formed on a top side of the battery cover (5) through a side gap of the battery cover (5), and the upper copper electrode (6), the battery cover (5) and the alloy plate (3) are connected by bolts to form a metal fuel monomer;

wherein the metal fuel monomer is put into the housing (1) through a mouth part of the housing (1), and an annular protrusion (e) is formed around the mouth part of the housing (1), the annular protrusion (e) is inserted into the annular groove (i) formed on the bottom side of the battery cover (5), and the annular protrusion (e) presses the sealing ring (4) in the annular groove (i) formed on the bottom side of the battery cover (5);

wherein a circular through hole is formed in a lower part of the housing (1), and three locating holes (a) are evenly distributed around the through hole, a circular groove is on one side of the housing (1) at a position corresponding to one end of the circular through hole, and a circular protrusion is formed on an opposite side of the housing (1) at a position corresponding to another end of the circular through hole, and a sealing ring is arranged inside the circular groove, and when the plurality of unit bodies are grouped together by bolts through the three locating holes, the sealing rings are compressed by the circular protrusions and a seal between each pair of the plurality of unit bodies is realized;

wherein the three locating holes (a) include an upper locating hole above the circular through hole, a left locating hole on the left of the circular through hole, and a right locating hole on the right of the circular through hole, the upper locating hole is formed in and passes through a support (b) in the housing (1), and both sides of the housing are supported by the support (b);

wherein a reinforcing rib (f) is set on both sides of the mouth part of the housing (1);

wherein the bottom side of the battery cover (5) is provided with an inclined plane (m);

wherein a slope (h) is formed in a bottom of the housing (1), whose inclination is between 2 and 60 degrees;

wherein the two end portions on the top side of the housing (1) each is provided with a groove (d), and a locating hole is in a groove (d), slipknot bolts are put into the groove (d), and positioned by bolts passing through locating holes, by the pre-tightening of slipknot bolts and a pressing plate in an upper part of the battery cover (5), the battery cover (5) is fixed on the housing (1), a through hole (g) is formed beside each groove (d), and the through hole (g) passes through an inner cavity of the housing (1), grooves and protrusions are formed on two sides of the housing (1) at a position corresponding to two ends of the through hole (g), respectively, seal rings are placed in the grooves, thus when the plurality of unit bodies are grouped together by bolts passing through locating holes in the groove (d), a seal between each of pair of the plurality of unit bodies is realized;

wherein a height of one end of the inclined plane (m) is above the through hole (g) on the housing (1).

2. The metal air fuel cell according to the claim 1, wherein bolt holes (C) are provided on both sides of the housing (1), so that the metal fuel monomer is fastened and positioned.

3. The metal air fuel cell according to the claim 1, wherein a column support (j) is provided on the bottom side of the battery cover (5) for fixing the alloy plate (3), a top of the column support (j) is provided with a groove, in which a seal ring is placed, sides of both ends of a battery cover are provided with grooves (k), and slipknot bolts pass through grooves (k), and slipknot bolts are fixed not to fall, which is convenient for installation, one end of a battery cover has a long strip through hole (L), and the upper copper electrode passes smoothly through a long strip through hole (L), the other end of the inclined plane (m) inclines downward, whose inclination angle is between 1 and 45 degrees, a convex (n) on a battery cover is matched with a mouth part of a housing.

4. The metal air fuel cell according to the claim 1, wherein the metal air fuel cell also includes a plug (9), a slagging rod (10), and a threaded joint (11),
the slagging rod (10) having an end fixed with the plug (9), an inside surface of the plug (9) is provided with an internal thread (o) to be connected to the threaded joint (11), an O type gasket is placed inside the plug (9) for sealing the plug (9) and the thread joint (11), and the threaded joint (11) is fixed on the battery housing (12) by bonding.

5. The metal air fuel cell according to the claim 4, wherein a plurality of grids (p) are evenly spaced and formed on the slagging rod (10), the spacing of each pair of grids (P) is equal to the distance between each of metal fuel monomers, each of the plurality of grids is arranged in the closed area between cavities of metal fuel monomers, and a gap or through hole is set on each grid.

6. The metal air fuel cell according to the claim 5, wherein a block (q) is formed on an end of the slagging rod (10) opposite to the one end fixed with the plug (9), and a bottom of a block has a through hole (r).

* * * * *